Nov. 25, 1958 W. A. FREEBORN 2,862,171

CONTROL APPARATUS

Filed Jan. 2, 1957 2 Sheets-Sheet 1

INVENTOR.
WILLIAM A FREEBORN

BY

Omund R Dahle

ATTORNEY

Nov. 25, 1958 W. A. FREEBORN 2,862,171

CONTROL APPARATUS

Filed Jan. 2, 1957 2 Sheets-Sheet 2

INVENTOR.
WILLIAM A. FREEBORN

BY Omund R. Dahle

ATTORNEY

United States Patent Office 2,862,171

Patented Nov. 25, 1958

2,862,171

CONTROL APPARATUS

William A. Freeborn, Minneapolis, Minn., assignor to Minneapolis-Honeywell Regulator Company, Minneapolis, Minn., a corporation of Delaware Application January 2, 1957, Serial No. 632,153

10 Claims. (Cl. 321—45)

This invention relates to control apparatus, and more particularly relates to an electric modulator in which an alternating current excitation signal is modulated in phase and magnitude by a direct current modulating signal of variable polarity and magnitude.

In control apparatus it is frequently desirable to employ condition responsive devices which have a relatively small direct current output. If this signal is to be used ultimately to control some power device, it must be greatly amplified. It is in this amplifying process that difficulty arises, for direct current amplifiers are often lacking in inherent stability. The problem is sidestepped, however, by changing the original direct current signal to an alternating current signal, which can then be amplified by an alternating current amplifier, in which stability is more easily obtained. In this latter connection, mechanical "choppers" have been used successfully; however, they have the drawbacks of having a limited and fixed frequency of operation and a mechanical deterioration due to the moving contacts. Electric modulators, on the other hand, do not have these drawbacks, but frequently do display another unwanted feature, drift. By drift is meant the shifting of the modulator's output with no change in the direct current modulating input; this is brought about in most instances by external effects, such as temperature changes, which change the parameters of the modulator's circuit components. My invention minimizes drift. It also minimizes other undesirable effects, as will be explained herein.

It is an object of this invention to provide new and useful electric circuits for modulating an alternating current with a direct current.

Another object of this invention is to provide electronic circuitry for modulating an alternating current with a direct current with a minimum of drift.

A still further object of this invention is to provide electric circuitry for a modulator in which a minimum amount of noise and spurious signals are produced.

These and other objects of the present invention will be understood upon consideration of the accompanying specification, claims, and drawings of which:

Figure 1:
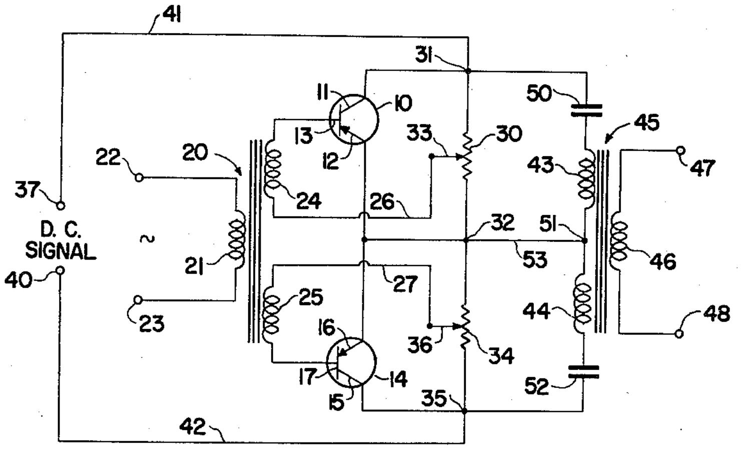
Figure 1 is a schematic representation of a modulator embodying the invention.

With reference now to Figure 1, there is shown a transistor 10, which may be, for example, a PNP junction transistor, which has a collector electrode 11, an emitter electrode 12, and a base electrode 13. Also shown is another transistor 14, which may be of the same type as transistor 10, having a collector electrode 15, an emitter electrode 16, and a base electrode 17. An input transformer 20 is shown and has a primary winding 21 connected across excitation input terminals 22 and 23, and also has two secondary windings 24 and 25. Winding 24 has one end connected to base 13 and the other end connected to conductor 26. Winding 25 has one end connected to base 17 and the other end connected to conductor 27. Potentiometer 30 is connected between nodes 31 and 32, and has its adjustable tap 33 connected to conductor 26. Potentiometer 34 is connected between nodes 32 and 35 and has its adjustable tap 36 connected to conductor 27. Node 32 is connected directly to emitters 12 and 16 of transistors 11 and 14, respectively.

Terminals 37 and 40 are the direct current modulating signal input terminals. Terminal 37 is connected by conductor 41 to node 31; terminal 40 is connected by conductor 42 to node 35. Output transformer 45 is shown to have an output winding 46 connected to output terminals 47 and 48, and also to have input windings 43 and 44, which are connected to capacitor 50, and the other end of winding 43 is connected to junction 51. One end of winding 44 is connected to capacitor 52 and the other end of winding 44 is connected to junction 51. Junction 51 is connected to node 32 by conductor 53. Capacitors 50 and 52, each of which has one side connected to a transformer winding, have their other sides connected to nodes 31 and 35, respectively.

Figure 2:
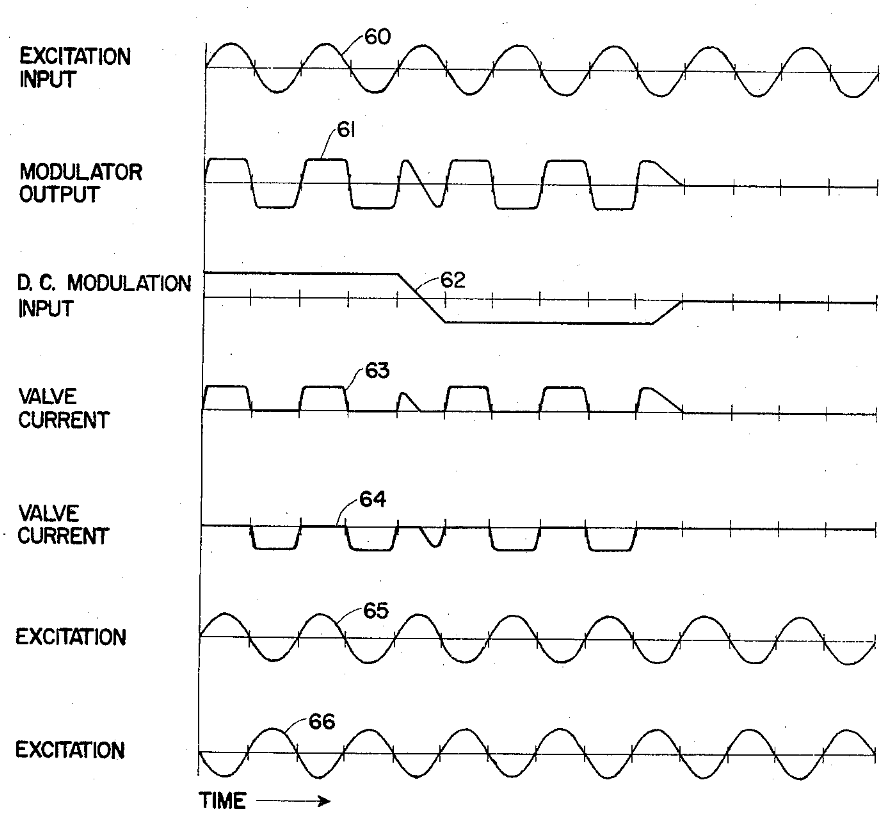
Figure 2 is a pictorial representation of some of the waveforms appearing in the circuit of Figure 1.

Figure 2 depicts several wave forms, all of which are drawn on the same time base. Curve 60 shows the excitation input sine wave across terminals 22 and 23. Curve 61 shows the alternating current output appearing across terminals 47 and 48, and the direct current modulating input signal is shown as curve 62. The currents through transistors 10 and 14, from collector to emitter in each case, are shown as curves 63 and 64, respectively. Also shown are curves 65 and 66, which represent the voltages from base 13 to conductor 26 and from base 17 to conductor 27, respectively. The curves in Figure 2 are used as an aid in explanation of the operation of Figure 1.

Figure 3:
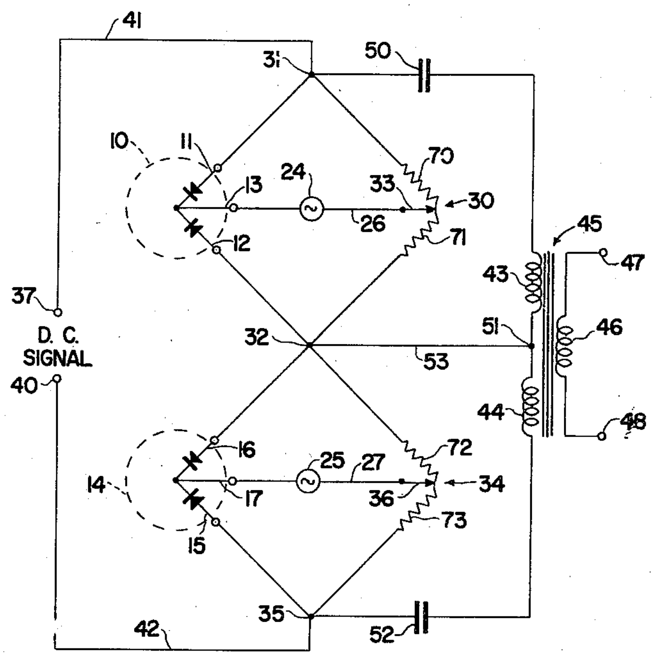
Figure 3 is a schematic representation of a circuit similar to that of Figure 1 but rearranged to aid in understanding the operation of the circuit in Figure 1.

Figure 3 is a rearrangement and simplification of Figure 1. Most of the circuit of Figure 3 is identical to that of Figure 1, and corresponding components carry the same identifying numerals as in Figure 1. Figure 3 shows alternating current sources 24 and 25 connected exactly the same as are transformer windings 24 and 25 in Figure 1. Figure 3 also shows transistors 10 and 14 as comprising two diodes each, connected back to back, to more easily illustrate the operation of the circuit. In addition, the upper and lower portions of potentiometers 30 and 34 are assigned numerals. In potentiometer 30, that portion of resistance above variable tap 33 is part 70 and that part below tap 33 is part 71. In potentiometer 34 the resistances above and below variable tap 36 are part 72 and part 73, respectively.

Figure 4:
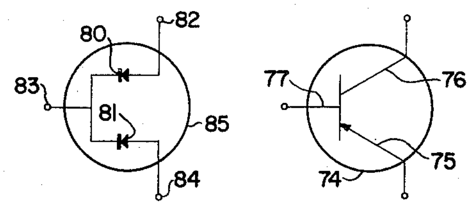
Figure 4 is a schematic representation of electric valves that may be used in a circuit embodying this invention.

Figure 4 shows a transistor 74 having an emitter electrode 75, a collector electrode 76, and a base electrode 77. Also shown is a configuration of two diodes 80 and 81. Diode 80 is connected in the forward direction from terminal 82 to terminal 83, and diode 81 is connected, also in the forward direction, from terminal 84 to terminal 83. This configuration 85 is then a three terminal network, which is equivalent for many applications to transistor 74.

*Operation of Figure 1*

With reference now to Figure 1, it will be noted that the variable tap 33 of potentiometer 30 is connected to one end of transformer winding 24. The other end of winding 24 is connected to base 13 of transistor 10.

Since potentiometer 30 is connected from node 31 to node 32, which in turn are connected to collector 11 and emitter 12, any voltage appearing across winding 24 will cause base 13 to have a polarity which is opposite with respect to both collector 11 and emitter 12. The transistor 10, shown as a PNP transistor, has a very low impedance between collector 11 and emitter 12 whenever base 13 is sufficiently negative with respect to collector 11 and emitter 12. On the other hand, when base 13 is positive with respect to collector 11 and emitter 12, the output impedance, the impedance between collector 11 and emitter 12, will be very high. In this manner, then, transistor 10 may be operated as an electrically controllable switch. And, since the biasing current from winding 24 is sufficiently large in this case, transistor 10 operates as a bi-directional switch; that is, current from an external source can travel in either direction between emitter 12 and collector 11 with substantially equal ease. This assumes, of course, that the current due to the external source is small enough so that it will not override the biasing current.

It can be seen that transistor 14 is connected to operate in the same manner as transistor 10, however, the current to bias transistor 14 to a conducting state and a non-conducting state, or on and off, flows from winding 25. Since windings 24 and 25 are connected to transistors 10 and 14 in a manner that causes base 13 to become more positive when base 17 becomes more negative, the switching actions of transistors 10 and 14 are 180° out of phase with each other. Speaking of transistors 10 and 14 as switches, then, when transistor 10 is on, transistor 14 is off, and vice versa. The frequency of switching, of course, is determined entirely by the frequency of the alternating current excitation source connected across terminals 22 and 23, which are connected to transformer primary winding 21.

It can be seen from the above that in operation one transistor is on when the other transistor is off, and that the transistors will alternately interchange conditions in accordance with an alternating current excitation applied to primary winding 21 of transformer 20. It is also seen that the output electrodes, of transistor 10, collector 11 and emitter 12, are connected in parallel relation to winding 43 of transformer 45 through capacitor 50 and conductor 53. In like manner, the output electrodes of transistor 14, collector 15 and emitter 16, are connected in parallel relation to transformer winding 44 through capacitor 52 and conductor 53. While capacitors 50 and 52 block the passage of direct current, their alternating current impedance at the frequency of the excitation source is very small. The switching action of transistors 10 and 14, as a result, alternately and repetitively places a very low impedance across, and effectively shorts, windings 43 and 44, respectively.

With the above action now established, the operation of the circuit becomes quite clear. Suppose, for example, that a direct current modulating voltage is connected across terminals 37 and 40 so as to make terminal 37 more positive than terminal 40. Suppose also that at this instant transistor 10 is in the off condition and consequently that transistor 14 is in the on condition. Current will then flow from terminal 37 through conductor 41 to node 31, through capacitor 50 and winding 43 to node 51, through conductor 53 to node 32, through transistor 14 from emitter 16 to collector 15 and to node 35, and through conductor 42 back to terminal 40. It is seen that transistor 14 shunts substantially all of the current, allowing virtually none to flow through winding 44. The current does, however, flow through winding 43, and thereby establishes a voltage across terminals 47 and 48, connected to output winding 46. Now, with the direct current modulating source unchanged, the current path will be traced for the next half-cycle of the excitation, that is, with transistor 10 in the on condition and transistor 14 in the off condition. It is now seen that current flowing from terminal 37 through conductor 41 to node 31 is shunted through transistor 10 from collector 11 to emitter 12 and flows through node 32, conductor 53, node 51, winding 44, capacitor 52, node 35, and conductor 42 back to terminal 40. It is seen that on this half-cycle of excitation, while the current from the modulating source travels in the same direction, it now goes through winding 44 from node 51 to capacitor 52. In the previous half-cycle, the current flowed through winding 43 from capacitor 50 to node 51; and, since windings 43 and 44 are connected in series-opposing relation, the current during one half-cycle causes the potential at output terminals 47 and 48 to be the opposite of that during the subsequent half-cycle. An alternating current output is thus produced from the direct current modulating signal. It is also obvious that when the polarity of the direct current modulating signal is reversed so that terminal 40 is more positive than terminal 37, current still flows alternately through windings 43 and 44, but flows in the opposite direction of the case above, and the alternating current output across terminals 47 and 48 will be 180° out of phase with the output of the previous case. It is evident therefore, that the phase of the alternating current output is determined by the polarity of the direct current modulating input. In addition, it is evident that the magnitude of the current flowing through windings 43 and 44 depends upon the magnitude of the potential between terminals 37 and 40. Not only, then, is the phase of the alternating current output controlled by the polarity of the direct current modulating input, but also the magnitude of the alternating current output is controlled by the magnitude of the direct current modulating input.

With the above basic operation of the circuit of Figure 1 established, consideration will now be given to the manner in which the output is kept free of spurious signals. Referring to Figure 3, one notes that the circuit is simply a rearrangement of the circuit in Figure 1, with transformer windings 24 and 25 of Figure 1 shown as alternating current sources 24 and 25 in Figure 3, and with transistors 10 and 14 shown as pairs of diodes. It is seen, in Figure 3, that potentiometer 30 and transistor 10 form a bridge, which is energized by source 24 and the output terminals of which are connected through capacitor 50 across winding 43. The arms of this bridge are, starting at node 31, the upper part 70 of the potentiometer 30, the lower part 71 of potentiometer 30, the diode from emitter 12 to base 13, and the diode from base 13 to collector 11. It is clear in this arrangement, with adjustable tap 33 positioned correctly to balance the bridge, the potential, due to source 24, at node 31 is always equal to that at node 32, and, hence, that no current from source 24 can flow through winding 43. Likewise, potentiometer 34 and transistor 14 form a bridge which is energized by source 25 and the output of which is connected through capacitor 52 and conductor 53 to winding 44. Again, with proper balance of the bridge by adjustment of adjustable tap 36, no current from source 25 can flow through winding 44. Since no current can flow from either source 24 or 25 through windings 43 and 44, the output appearing across terminals 47 and 48 can have no signal components directly due to current from sources 24 and 25; that is, any signal appearing between terminals 47 and 48 will be due to current flowing from the direct current modulating input at terminals 37 and 40.

Temperature changes, or other external effects, will in some cases unbalance the bridges somewhat, because the collector diodes will not always change impedence by the same amount as the emitter diodes for equal temperature changes. This might seem to have rather serious consequences; however, the circuit shown avoids these difficulties as follows: When transistor 10 is in the on condition, the direct current input is effectively connected across nodes 32 and 35. Now, when the direct current input source has very low impedence compared to winding 44 and the impedance of the bridge between nodes 32 and 35, any slight current due to unbalance of the bridge will be shunted by the very low impedence direct current input source and will, therefore, develop only a negligible voltage between nodes 32 and 35. At the same instant, transistor 10 is in the on position, and the impedance between emitter 12 and collector 11 is so small that no significant voltage drop due to source 24 can be developed across nodes 31 and 32. It is clear that a similar process occurs, of course, during the next excitation half-cycle, but with transistor 10 and 14 interchanging conditions, for the circuit is symmetrical. It is seen, then, that the bridge arrangement normally eliminates the possibility of the excitation signal appearing in the output of the circuit when the direct current modulating signal is zero; and it is further clear that even the presence of unbalance in the bridge arms of this circuit have almost no effect on the output signal.

It is not necessary, of course, that elements 10 and 14 be transistors. Other electric valve devices would work well in a circuit embodying the invention. Referring to Figure 4, for example, one can see that a configuration such as combination 85, including diodes 80 and 81, connected as shown, could replace, for switching purposes, a transistor such as transistor 74. In making this substitution, electrodes 82, 83, and 84, would be connected in place of the transistor collector, base, and emitter electrodes, respectively. Transistors 10 and 14, then, could be replaced with diodes as shown in 85 of Figure 4, if desired.

In one successful embodiment of the invention in which excellent results were obtained at very low levels of direct current modulating input, the following components were used:

| | |
|---|---|
| Transistors 10 and 14 | Philco SB100. |
| Potentiometers 30 and 34 | 16,000 ohms. |
| Capacitors 50 and 52 | 8.0 mfd. |
| Transformer 45 | 1:1 turns ratio between windings 43 and 46 and between windings 44 and 46. |

In addition, sources 24 and 25 were 180 degrees out of phase with each other, and the direct current modulating source connected across terminals 37 and 40 had low internal impedance.

Many changes and modifications of this invention will undoubtedly occur to those who are skilled in the art and I therefore wish to be understood that I intend to be limited by the scope of the appended claims and not by the specific embodiment of my invention which is disclosed herein for the purpose of illustration only.

I claim:

1. An electric modulator comprising: first and second semiconductor amplifying devices, each having a plurality of electrodes including a base electrode, an emitter electrode, and a collector electrode; first and second impedance means connected, respectively, from the emitter to the collector of said first device and from the emitter to the collector of said second device, said impedance means each having an intermediate connection; alternating current bias means connected to said intermediate connections and to said bases to bias said first device to a conductive condition and said second device to a non-conductive condition during a first half-cycle of said alternating current bias and to interchange said conditions during the next half-cycle of said bias; first conductive means interconnecting said emitters, transformer means having input and output windings, said input winding having a first part connected between a first terminal and a second terminal, and having a second part connected between said second terminal and a third terminal in an opposing sense to said first part; second conductive means connecting said second terminal to said emitters; circuit means connecting said first terminal to one of said collectors and connecting said third terminal to the other of said collectors; a source of direct current signal input; and third conductive means connecting said source from one of said collectors to the other of said collectors, so that, upon presence of a direct current signal, current flows through said first device and said second part during said first half-cycle of said bias through said second device and said first part during the said next half-cycle of said bias, the direction and magnitude of said current flow being dependent upon the polarity and magnitude of said direct current signal, and consequently across said output winding appears an alternating output signal of a phase and magnitude dependent upon the polarity and magnitude of said direct current signal input.

2. An electric modulator comprising: first and second semiconductor switching devices, each having input and output terminals and being operable by suitable input signals to on and off conditions respectively presenting across said output terminals a highly conductive current path and a substantially non-conductive current path; excitation current means connected to the input teminals of said devices to operate said first device to one of said conditions and said second device to the other of said conditions and to cyclically interchange said conditions; transformer means having an output winding and having an input winding comprising a first winding connected in series opposing relation to a second winding; first conductive means connecting the output terminals of said first and second devices, respectively, in parallel relation to said first and second windings; a source of modulating signal; and second conductive means connecting said source in parallel relation to said input winding, so that, due to said interchange of conditions shunting alternately said first winding and said second winding with said highly conductive current paths, an alternating signal, of phase and magnitude determined by the polarity and magnitude of said modulating signal, appears across said output winding.

3. An electric modulator comprising: transformer means having an input winding, comprising a first winding connected in series-opposing relation to a second winding, and having an output winding; first and second electric switching devices having input and output electrodes and being controllable by an electric input to relatively high and low output impedance conditions; alternating current conducting means connecting the output electrodes of said first and second devices, respectively, in parallel relation to said first and second windings; alternating current excitation means connected to the input electrodes of said devices to establish one of said devices in each of said conditions and to cyclically interchange said conditions so that said first and second windings are alternately shunted, respectively, by said first and second devices; a source of direct current modulating signal; and circuit means, including said alternating current conducting means, connecting said source in parallel relation to said input winding so that, due to said cyclic interchange, current from said source flows alternately through said first and second windings, thus producing in said output winding an alternating signal of phase and magnitude dependent upon the polarity and magnitude of said modulating signal.

4. An electric modulator comprising: output transformer means having an output winding and an input winding, said input winding having two parts connected in series-opposing relation; switching means connected to said parts of said input winding, said switching means being operable by an alternating current to repetitively shunt alternately one and then the other of said parts; a source of modulating signal; conductive means connecting said source in parallel relation to said input winding, so that current from said source flows alternately through one and the other of said parts, thereby producing an alternating signal in said output winding of phase and magnitude determined by the polarity and magnitude of said modulating signal.

5. An electric modulator comprising: an output device having output terminals and having first and second input circuits, said first and second input circuits being connected in series-opposing relation so that a current flowing through said first circuit causes an electromotive force across said output terminals of opposite sense to that caused by said current flowing through said second input circuit; a source of modulating current; circuit means connecting said source to said first and second circuits so that said first circuit, said second circuit, and said source form a series loop; electrically controllable switching means connected across said first circuit and across said second circuit to cyclically and alternately shunt one and then the other of said input circuits, so that at said output terminals appears an alternating signal of phase and magnitude dependent upon the polarity and magnitude of said source of modulating current.

6. An electric modulator comprising: an output device having output terminals and having first and second input circuits, said first and second input circuits being connected in series-opposing relation so that a current flowing through said first circuit causes an electromotive force across said output terminals of opposite polarity to that caused by said current flowing through said second input circuit; a source of modulating current; circuit means connecting said source to said first and second circuits so that said circuit means, said first circuit, said second circuit, and said source form a series loop; first and second switching bridge means operable to on and off conditions and each bridge means comprising an impedance means having an intermediate connection, and a semi-conductor amplifying device having a base electrode, an emitter electrode and a collector electrode, said impedance means being connected from said emitter to said collector; alternating current excitation means connected from the base to the intermediate connection in each of said bridge means to establish each of said bridge means in opposite operating conditions and to cyclically interchange said conditions; alternating current conductive means connecting the emitter and collector of said first and second bridge means, respectively, across said first and second input circuits, to cyclically shunt alternately one and the other of said input circuits, so that at said output terminals appears an alternating signal of phase and magnitude dependent upon the polarity and magnitude of said source of modulating current.

7. An electric modulator comprising: first and second semiconductor switching means each having input and output electrodes, said output electrodes presenting an output impedance controllable to a high and a low value by electric excitation signals transmitted to said input electrodes; first and second output means each having an input circuit and an output circuit, said circuits being interconnected so that said input circuits have a series relationship, said output circuits being coupled so that a current flowing alternately through one and then the other of said input circuits produces a full wave alternating electromotive force across said output circuits; means connecting the output electrodes of said first and second semiconductor switching means, respectively, in parallel relation to the input circuits of said first and second output means; a source of modulating signal; alternating current conductive means connecting said source in parallel relation with a series combination of said input circuits; excitation means connected to the input electrodes of said semiconductor means to control said semiconductor means to said high and low values of output impedance so as to shunt alternately one and then the other of said input circuits, thereby producing an alternating signal across said output circuits of phase and magnitude determined by the polarity and magnitude of said modulating signals.

8. An electric modulator comprising: electrically actuated semiconductor switching means; a source of electric modulating signal; two output means each having an input circuit and a common output circuit, said input circuits being connected in series relation, and said circuits being so coupled that a potential connected across one and then the other of said input circuits produces electromotive forces of opposite sense across said output circuit; circuit means connecting said source across the series combination of said input circuits; and means connecting said switching means to said input circuits to shunt alternately one and the other of said input circuits so that an alternating electromotive force, of phase and magnitude determined by the character of said modulating signal, appears across said output circuit.

9. An electric modulator comprising: output means having an output circuit and having first and second input circuits, said first and second input circuits being so coupled to said output circuit that a current flowing through said first input circuit causes an electromotive force across said output circuit of opposite sense to that caused by said current flowing through said second input circuit; a source of modulating current of variable magnitude and reversible polarity; circuit means connecting said source to said first and second input circuits so that said first circuit, said second circuit, said circuit means, and said source form a series loop; electrically controllable switching means connected across said first circuit and across said second circuit to periodically shunt alternately one and then the other of said input circuits, so that, across said output circuit, appears an alternating signal of phase and magnitude dependent upon the polarity and magnitude of said source of modulating current.

10. An electric modulator comprising: first and second electrically controllable switching devices each having an on and an off condition; alternating current means connected to said devices to simultaneously switch one of said devices to said on condition and the other of said devices to said off condition, and to cyclically interchange said conditions; output means having two input circuits and an output circuit, said input circuits being connected in series relation, and said circuits being so phased that electromotive forces of opposite sense are produced across said output circuit by an electromotive force being connected across one and then the other of said input circuits; a source of modulating current of variable direction and magnitude; circuit means connecting said source in parallel relation to the series combination of said input circuits; and means connecting one of said switching devices in parallel relation to one of said input circuits and connecting the other of said switching devices in parallel relation to the other of said input circuits, so that said cyclical interchange of said conditions causes said modulating current to flow alternately through one and the other of said input circuits, thereby producing, across said output circuit, an alternating electromotive force of phase and magnitude determined by the direction of flow and magnitude of said modulating current.

References Cited in the file of this patent

UNITED STATES PATENTS

| | | |
|---|---|---|
| 2,511,468 | Harrison | June 13, 1950 |
| 2,780,725 | Johanson | Feb. 5, 1957 |
| 2,783,384 | Bright et al. | Feb. 26, 1957 |